United States Patent [19]
Gallas et al.

[11] Patent Number: 5,724,882
[45] Date of Patent: Mar. 10, 1998

[54] BREWED BEVERAGE MAKER WITH OPTICAL FEEDBACK SYSTEM

[76] Inventors: James M. Gallas, 1615 Wood Quat, San Antonio, Tex. 78249; Gerry Zajac, 2 S. 624 Marie Curie La., Warrenville, Ill. 60555

[21] Appl. No.: 605,632

[22] Filed: Feb. 22, 1996

Related U.S. Application Data

[63] Continuation-in-part of Ser. No. 368,700, Jan. 4, 1995, abandoned.
[51] Int. Cl.[6] .................................................. A47J 31/40
[52] U.S. Cl. .................... 99/285; 426/231; 426/433; 426/594; 356/410; 356/434; 356/436; 250/573; 250/576; 250/577
[58] Field of Search ........................ 426/231, 432, 426/433, 595; 99/285; 356/409, 410, 433, 434, 442, 436; 250/573, 574, 576, 577, 226, 229; 219/502

[56] References Cited

U.S. PATENT DOCUMENTS

| | | | |
|---|---|---|---|
| 2,502,844 | 4/1950 | Hildreth | 219/502 X |
| 3,430,232 | 2/1969 | Martin | 99/285 X |
| 3,560,714 | 2/1971 | McDonald | 219/502 |
| 3,576,646 | 4/1971 | Alwood | 426/231 |
| 3,606,829 | 9/1971 | Alwood | 219/502 X |
| 3,746,864 | 7/1973 | Tick et al. | 250/576 X |
| 3,773,424 | 11/1973 | Selgin | 250/576 X |
| 3,994,590 | 11/1976 | Di Martini et al. | 356/178 |
| 4,180,722 | 12/1979 | Clewans | 219/502 |
| 4,785,852 | 11/1988 | Sager | 426/433 X |
| 5,402,242 | 3/1995 | Nakano | 356/436 X |

FOREIGN PATENT DOCUMENTS

| | | | |
|---|---|---|---|
| 677839 | 3/1959 | Canada. | |
| 4409030 | 1/1995 | Germany | 426/433 |

*Primary Examiner*—Milton Cano

[57] ABSTRACT

A brewed beverage maker, such as a coffee maker, is provided having an automatic concentration control system. An optical feedback system is employed for controlling the concentration of brewed beverages such as coffee and tea. In preferred embodiments, this invention employs a light beam that is passed through the beverage as the beverage is being made to determine the concentration of the beverage. A control system compares the measured concentration to a desired concentration and controls the flow of water through a filter basket containing coffee, tea or the like.

8 Claims, 3 Drawing Sheets

BREWED BEVERAGE MAKER WITH OPTICAL FEEDBACK SYSTEM

BACKGROUND OF THE INVENTION

This is a continuation-in-part of application Ser. No. 08/368,700; filed Jan. 4, 1995, now abandoned.

FIELD OF THE INVENTION

The present invention relates to brewed beverage makers using a water component and one or more nonwater components, such as coffee or tea. More particularly, it relates to an optical feedback system for controlling the concentration of brewed beverages such as coffee and tea.

DISCUSSION OF THE PRIOR ART

Although the present invention may be applied to the preparation of brewed beverages other than coffee, it will, for the sake of simplicity, hereinafter be referred to particularly in connection with the preparation of coffee. In the following, the phrase "coffee grinds" refers to the material that one obtains after grinding coffee beans and that is used to make coffee; the word "coffee grinds" refers to the material that one obtains after grinding coffee beans and that is used to make coffee; the word "coffee" refers to the brewed product that results after water is passed through the coffee grinds; the word "receptacle" refers to the container which holds the final "coffee" product; and the word "basket" refers to the container which holds the "grinds."

In the standard drip coffee makers as are commonly used today, the concentration of the brewed coffee is determined by the amount and type of grinds placed into the basket and also by the amount of water added to the water reservoir. A disadvantage of such a coffee maker is that it has no self correction capacity for errors made by the person who measures the volume of water or the amount of coffee grinds. When the same volume of coffee is made on a daily basis, these errors are generally small; however, when the operator is called upon to vary the amount of coffee brewed from routine fixed values, the coffee concentration tends to deviate from its desired value. Because coffee concentration varies in a nonlinear manner with respect to the water volume, it is difficult for the operator to achieve the same concentration when called upon to prepare a new or unfamiliar volume of coffee, or when using a different type of coffee. For example, to double the volume of coffee made, it is not sufficient to simply double both the amount of water and the amount of coffee grinds to obtain coffee of the desired concentration because of the nonlinear relationship between the volumes of the constituent parts and the concentration of the resultant coffee. Therefore, it is difficult for a person who is preparing an unfamiliar volume of coffee to correctly estimate the amount of coffee grinds and water needed to obtain a desired coffee concentration.

Inconsistent concentrations of coffee also arise when the operator grinds his or her own coffee beans because the concentration of coffee is dependent upon how finely the beans are ground. Coffee concentration also varies with the particular type of coffee bean used.

Previously, it had been suggested to use an optical feedback system to monitor the concentration of brewed coffee and to make adjustments in the amount of water used for brewing in order to obtain a desired concentration in the resulting beverage (Alwood, U.S. Pat. No. 3,576,646; U.S. Pat. No. 3,606,829). However, these prior references used an incandescent light source to monitor the coffee concentration. This light source severely limited these prior systems because of the strong attenuation of incandescent light by coffee at normal concentrations. As a result, Alwood's art taught that a short optical path length should be used in order to implement an optical feedback type coffee maker.

SUMMARY OF THE INVENTION

The present invention utilizes a red LED or a near infrared (IR) light beam and a photodetector to provide a brewed beverage having a predetermined concentration. In presently preferred embodiments, during the brewing phase a red LED light beam is directed through the brewed beverage contained in the receptacle. The use of a red LED or a near IR light source (i.e. about 600 nm to about 1400 nm) exploits a specific feature or character of coffee's absorptivity namely, that coffee's absorbance is relatively low in the red and near IR regions of the electromagnetic spectrum. Thus, use of a red LED or near IR beam permits the concentrated electromagnetic wave to pass through the entire receptacle. A photodetector senses the intensity of the beam of red light after the light has passed entirely through and been attenuated by the beverage in the receptacle. The voltage produced by the intensity of the light striking the photodetector is compared to a pre-set threshold voltage in the control circuitry and the water flow is adjusted in a desired manner.

In preferred embodiments, the present invention controls the concentration of a brewed beverage, such as coffee, at a predetermined concentration by implementation of an optical feedback system (OFS). The advantage of this approach is that beverage concentration will be at or near a preselected level even when the person preparing the coffee makes errors in measuring the quantities of the grinds or water, or when he or she makes an error in estimating the quantities required when preparing non-typical volumes.

In ordinary practice, the concentration of the coffee as it leaves the basket and enters the receptacle is not constant over the complete brewing cycle. The concentration is highest in the beginning and decreases nonlinearly with brewing time. In alternative embodiments it is desirable to allow the pre-set threshold value to change in a predetermine manner during the brewing cycle. That is, the threshold value may be set higher (corresponding to a more concentrated mixture) later in the brewing cycle. This may be accomplished by employing a formula or an algorithm to generate threshold values that take into account the decreasing coffee concentration during the brewing cycle.

The presently preferred embodiments of this invention contemplate using a red or near IR light beam to measure the coffee concentration. In preferred embodiments, the frequency of light used is selected to be minimally attenuated by pure water and the glass of the receptacle. The light source may be a red light emitting diode (LED), laser or any light source in the region of wavelengths between about 600 nm and about 1400 nm. Further, it may be desirable to use reflectors and lenses to focus the light beam before and/or after the beam passes through the entire receptacle. The receptacle for collecting the brewed coffee may be the type of carafe commonly found with personal coffee makers or a dispensing pot commonly found with institutional coffee makers. It will be apparent to a person of skill in the art, having the benefit of this disclosure of this invention, that this invention will be beneficial in numerous other applications. Nothing in this disclosure is intended to limit the application of the invention herein to the embodiments and the applications expressly described herein.

BRIEF DESCRIPTION OF THE DRAWINGS

So that the manner in which the above recited advantages and features of the present invention, as well as others which will become apparent, are attained and can be understood in detail, a more particular description of the invention summarized above may be had by reference to preferred embodiments thereof which are illustrated in the appended drawings, which drawings form a part of this specification.

It is to be noted, however, that the appended drawings illustrate only typical embodiments of the invention and are therefore not to be considered limited of its scope, for the invention may admit to other equally effective embodiments.

DETAILED DESCRIPTION OF THE PREFERRED EMBODIMENTS

Figure 1:
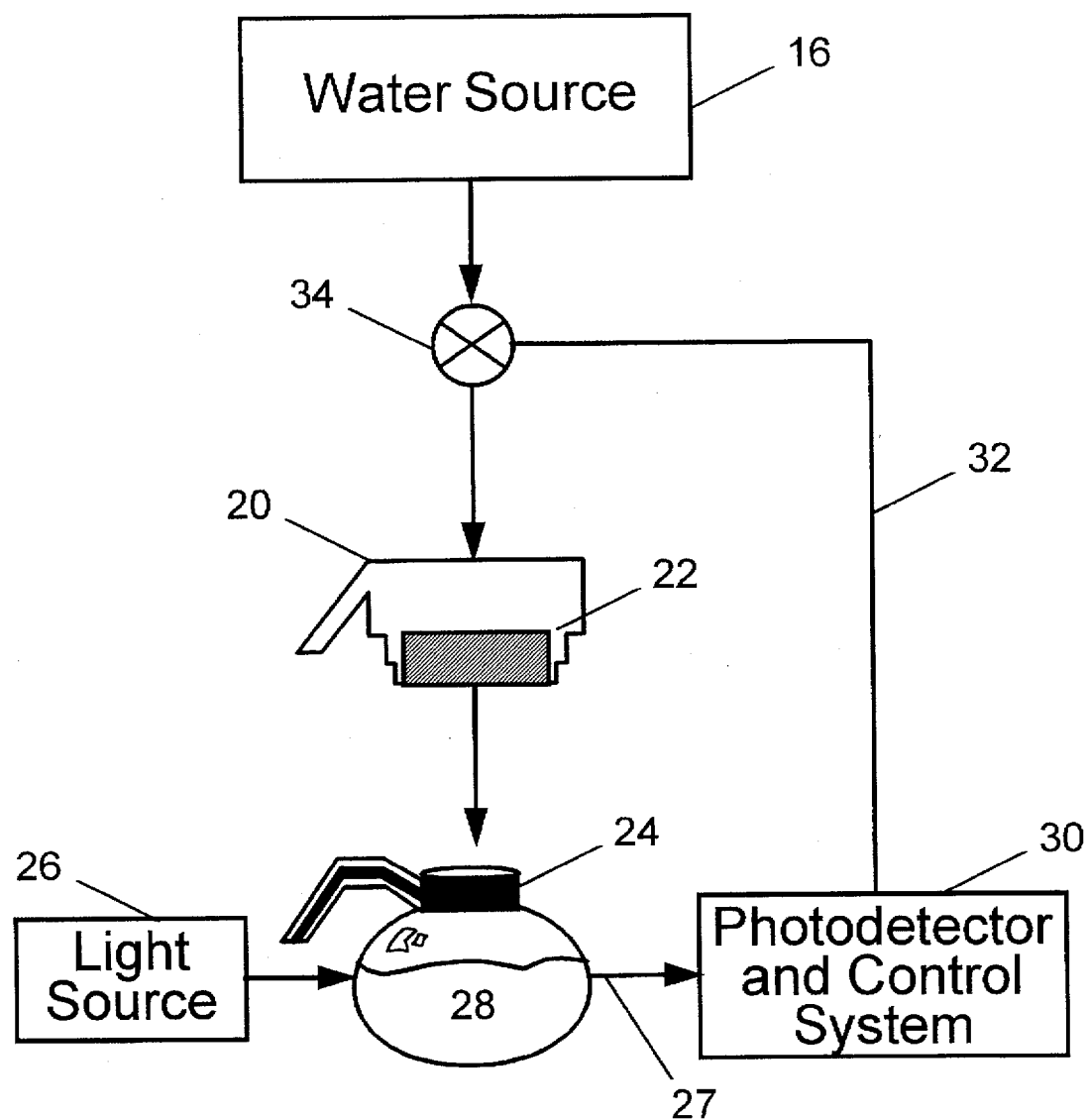
FIG. 1 is a schematic drawing according to a preferred embodiment, of a brewed beverage maker with an optical feedback system according to this invention.

FIG. 1 illustrates the features of a brewed beverage maker that exemplifies a preferred embodiment of this invention. Water flows from the water source (e.g. reservoir or supply line) 16 through filter basket 20 containing nonwater component (e.g. coffee grinds or tea leaves) 22. Beverage 28 then flows from basket 20 into receptacle. (e.g. carafe or dispensing pot) 24. A novel feature of this invention is the use of red or near IR light source 26 whose beam 27 is directed through beverage 28 in receptacle 24. While the coffee is flowing from the filter basket and into the receptacle, light beam 27 is detected on the other side of receptacle 24 by photodetector 30 after passing entirely through and being attenuated by the coffee in the receptacle. The degree of attenuation is proportional to the concentration of the beverage, and it correspondingly affects the intensity of the light impinging upon photodetector 30. The desired beverage concentration is adjustable by setting a threshold voltage in the photodetector circuitry.

A more sophisticated control scheme may be employed to use the optical system according to this invention to provide the desired concentration at the desired volume. The control system may include a microprocessor that is programmed to use an optical system as described above to periodically measure the concentration of the beverage in receptacle 24 and to compare that measured concentration to a predetermined desired concentration for that time in the brewing cycle.

When a brewing sequence is started, receptacle 28 will be empty, and the detected light intensity will exceed the preselected threshold due to absence of liquid in the receptacle to attenuate the light beam 27. The system may be designed to permit normal flow of water into basket 20 until the presence of liquid at the detector level is sensed by the detector (which will be marked by a substantial reduction in the amount of light received by the detector), at which time the control system may switch into a controlling mode, as discussed above.

Figure 2:
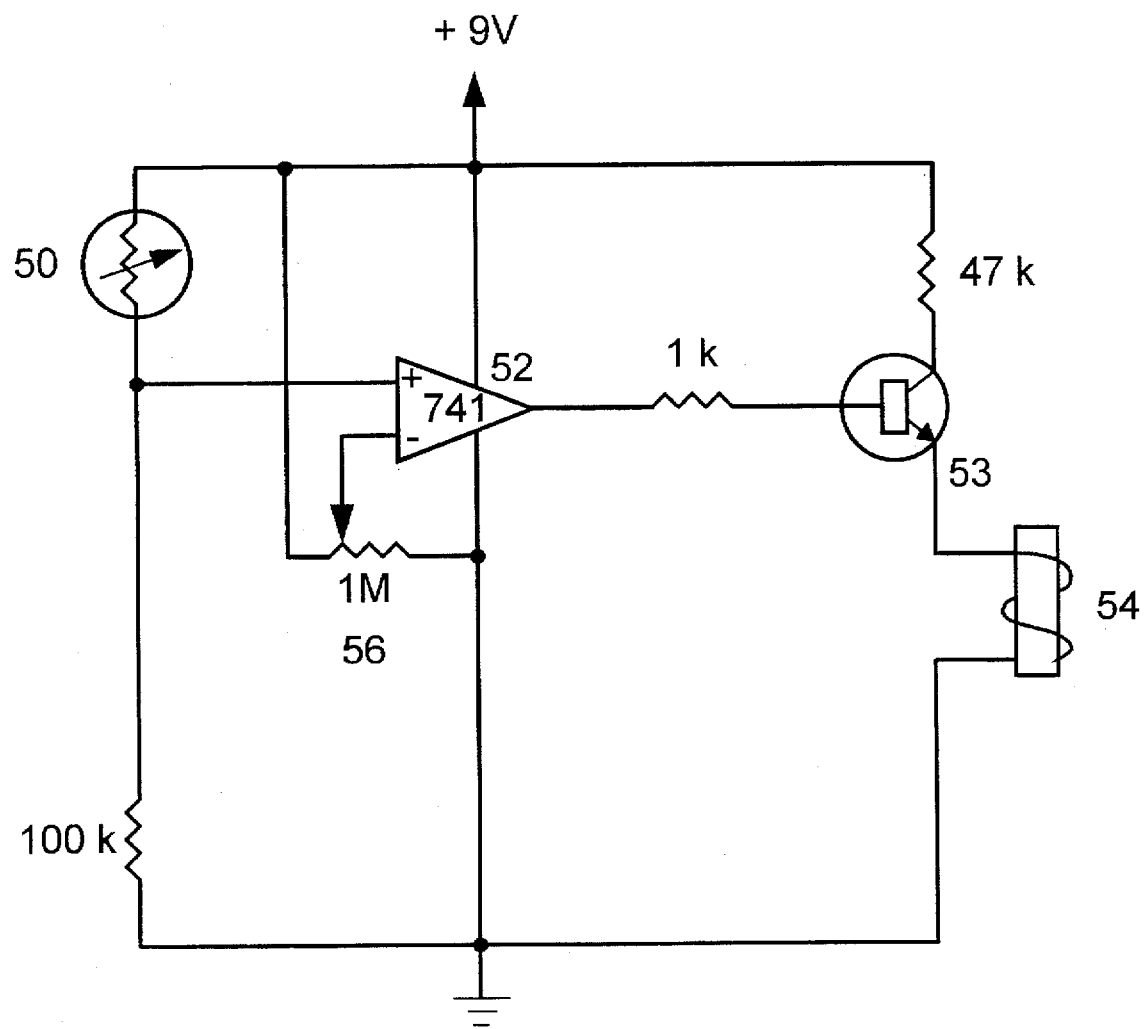
FIG. 2 is a circuit diagram of a photoresistor/relay system that may be employed in the present invention.

FIG. 2 shows one embodiment of a photodetector suitable for use in the present invention—a photoresistor circuit. The intensity of light reaching the photodetector causes a proportional change in the voltage across the photoresistor 50. This voltage may be compared, using op amp comparator 52, with a preselected threshold voltage set by adjusting variable resistor 56. When the voltage across photoresistor 50 reaches the reselected threshold value the output of op amp 52 changes state, causing transistor 53 to become conductive and to actuate relay 54. The load contacts of relay 54 may be arranged in a series circuit with a power supply and solenoid coil that operates supply control valve 34, all of which are connected by signal line 32.

Figure 3:
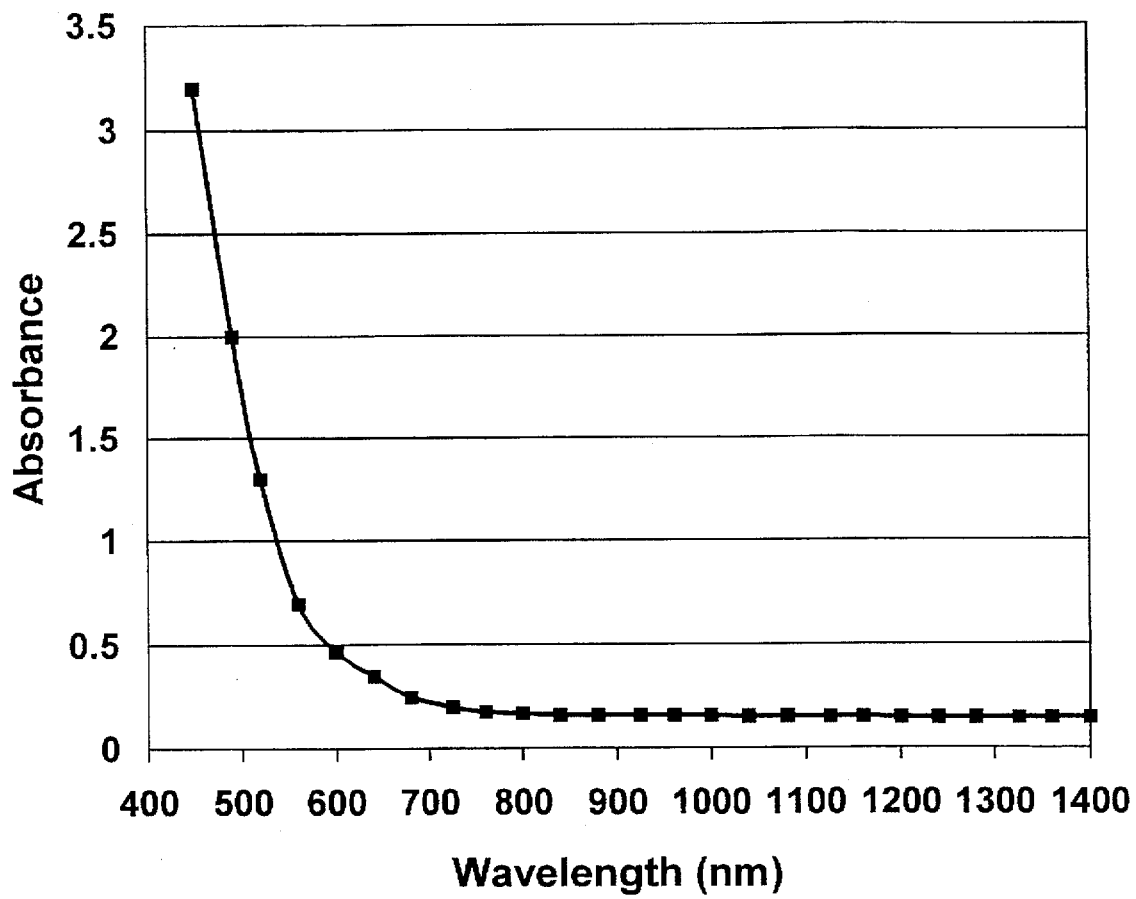
FIG. 3 is a graph of the optical density of coffee as a function of wavelength.

FIG. 3 is a graph of the optical absorbance of coffee as a function of the wavelength of electromagnetic radiation being absorbed. This graph was generated using a typical coffee concentration (i.e. 11 g of grinds and 8 cups of water) with a Perkin-Elmer Absorption Spectrophotometer which scans the wavelength of the electromagnetic radiation and records the absorption at each wavelength. The source of light was standard hydrogen and tungsten lamps.

At about 1400 nm, the absorption bands of water begin to absorb the electromagnetic wave and the absorption curve should abruptly increase. Between about 700 nm and about 1400 nm the absorbance continues to decrease steadily, but at a much slower rate than at the shorter wavelengths. For example, the absorbance decreases by about 50% from 450 nm to 700 nm. However, only about a 15% loss in absorbance occurs from 700 nm to 1400 nm.

Therefore, as the wavelength is increased and approached about 1400 nm the light will more readily pass through the carafe of coffee. Beyond about 1400 nm the absorbance will start increasing because water will begin absorbing the electromagnetic radiation. Thus, the ideal light source should have a wavelength around 1400 nm. On the other hand, most of the decrease in absorbance has already occurred by a wavelength of about 700 nm and red LED's (having a wavelength of about 600 nm to about 700 nm) are currently less expensive than near IR emitters and detectors, thus the red LED is a good trade off since not that much radiation absorbance is sacrificed between about 700 nm and about 1400 nm.

We claim:

1. A coffee maker having an optical system for controlling the concentration of the coffee that is made, comprising:

a coffee maker including a source of hot water, basket for holding ground coffee, and a receptacle for collecting brewed coffee from the basket;

a supply control valve coupled to the source hot water, the supply control valve being selectively operable to direct hot water into the basket, to direct hot water through a bypass conduit into the receptacle, or to block the flow of hot water from the source;

a control system comprising a red or near infrared light source and it photodetector, the light source providing a beam of light directed through the entire receptacle; the photodetector being positioned to intercept the beam of light after it has passed through the entire receptacle;

the control system further comprising a comparator for comparing an output from the photodetector to a preselected threshold valve corresponding to a desired coffee concentration: the comparator being operable to a signal indicating whether the concentration of the coffee in the receptacle is above or below the desired concentration;

the control system being coupled to the supply control valve to operate the valve in response to the signal provided by the comparator.

2. The coffee maker of claim 1, wherein the light source comprises a red light emitting diode.

3. The coffee maker of claim 1, wherein the light source has a wavelength of between about 600 nm and about 700 nm.

4. The coffee maker of claim 1, wherein the light source has a wavelength of between about 600 nm and about 1400 nm.

5. The coffee maker of claim 1, wherein the beam of light is modulated, and wherein the control system comprises a tuned receiver for identifying the modulated beam of light.

6. The system of claim 4, wherein the light source is positioned on one side of the receptacle and the photodetector is positioned on the opposite side of the receptacle from said one side.

7. The system of claim 4, wherein the light source comprises a red light emitting diode.

8. The system of claim 4, wherein the light source comprises a red or near infrared laser emitter.

* * * * *